US012643703B2

(12) United States Patent     (10) Patent No.: US 12,643,703 B2
Kim et al.     (45) Date of Patent: Jun. 2, 2026

(54) FOOD INPUTTING APPARATUS AND FOOD INPUTTING METHOD

(71) Applicant: CJ CHEILJEDANG CORPORATION, Seoul (KR)

(72) Inventors: Sun Dong Kim, Suwon-si (KR); Young Hun Seo, Suwon-si (KR); Sung Ha Lee, Suwon-si (KR); Jae Man Jeon, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 232 days.

(21) Appl. No.: 18/039,215

(22) PCT Filed: Jul. 5, 2021

(86) PCT No.: PCT/KR2021/008497
§ 371 (c)(1),
(2) Date: May 26, 2023

(87) PCT Pub. No.: WO2022/114432
PCT Pub. Date: Jun. 2, 2022

(65) Prior Publication Data
US 2023/0415944 A1    Dec. 28, 2023

(30) Foreign Application Priority Data
Nov. 30, 2020    (KR) ........................ 10-2020-0164258

(51) Int. Cl.
B65B 65/00    (2006.01)
B65B 25/00    (2006.01)
(Continued)

(52) U.S. Cl.
CPC ............ B65B 65/00 (2013.01); B65B 25/001 (2013.01); B65B 37/02 (2013.01); B65B 39/002 (2013.01);
(Continued)

(58) Field of Classification Search
None
See application file for complete search history.

(56) References Cited

U.S. PATENT DOCUMENTS 3,498,344 A * 3/1970 Bruder .................... B65B 39/08
                       141/93
3,830,266 A * 8/1974 Hudson ................... B65B 39/10
                       141/10
(Continued)

FOREIGN PATENT DOCUMENTS

JP    H04-253602 A    9/1992
JP    H05-68804 U    9/1993
(Continued)

OTHER PUBLICATIONS

International Search Report issued in corresponding International Patent Application No. PCT/KR2021/008497 dated Sep. 14, 2021.

*Primary Examiner* — William R Harp
(74) *Attorney, Agent, or Firm* — Morgan, Lewis & Bockius LLP

(57) ABSTRACT

The food inputting apparatus according to the present invention comprises: a supply unit provided so as to supply food downwardly; a chute unit comprising a chute body through which food discharged from the supply unit falls and passes due to gravity; a shutter unit provided so as to be opened or closed in accordance with whether the food discharged from the chute unit is to be discharged into packaging material, and comprising a shutter body which, when closed, is positioned between the upper part of an upwardly opened opening of the packaging material and a chute outlet provided at the bottom end of the chute unit; and a suction unit for suctioning liquid that collects inside the shutter body when closed.

14 Claims, 9 Drawing Sheets

(51) Int. Cl.

| | |
|---|---|
| *B65B 37/02* | (2006.01) |
| *B65B 39/00* | (2006.01) |
| *B65G 11/02* | (2006.01) |
| *B65G 11/16* | (2006.01) |

(52) U.S. Cl.
CPC .......... *B65G 11/023* (2013.01); *B65G 11/163* (2013.01); *B65B 2210/08* (2013.01); *B65G 2201/0202* (2013.01)

(56) References Cited

U.S. PATENT DOCUMENTS

| | | | |
|---|---|---|---|
| 4,792,031 A * | 12/1988 | Warner | B65B 39/007 141/339 |
| 6,340,036 B1 | 1/2002 | Toyoizumi et al. | |
| 7,422,616 B2 | 9/2008 | Nosaka | |
| 7,430,843 B2 | 10/2008 | Wild et al. | |
| 10,010,893 B2 | 7/2018 | Ikushima | |
| 10,562,045 B2 | 2/2020 | Ikushima | |
| 2005/0205152 A1 | 9/2005 | Nosaka | |
| 2006/0196152 A1 | 9/2006 | Wild et al. | |
| 2016/0199868 A1 | 7/2016 | Ikushima | |
| 2018/0272364 A1 | 9/2018 | Ikushima | |

FOREIGN PATENT DOCUMENTS

| | | |
|---|---|---|
| JP | H06-69101 U | 9/1994 |
| JP | 2007-008564 A | 1/2007 |
| JP | 3907918 B2 | 4/2007 |
| JP | 4040516 B2 | 1/2008 |
| JP | 2009-184740 A | 8/2009 |
| JP | 2010-214656 A | 9/2010 |
| JP | 2013-112368 A | 6/2013 |
| JP | 2014-122042 A | 7/2014 |
| JP | 2019-066299 A | 4/2019 |
| JP | 2019-172318 A | 10/2019 |
| KR | 10-1202692 B1 | 11/2012 |
| KR | 10-2016-0053922 A | 5/2016 |
| KR | 10-2017-0021656 A | 2/2017 |
| KR | 10-2017-0106994 A | 9/2017 |
| KR | 10-2019-0017332 A | 2/2019 |
| KR | 10-2110731 B1 | 5/2020 |

* cited by examiner

FOOD INPUTTING APPARATUS AND FOOD INPUTTING METHOD

TECHNICAL FIELD

The present invention relates to a food inputting apparatus and a food inputting method.

BACKGROUND ART

An equipment for producing food including both solid materials and liquid materials may produce manufactured food through a process of putting finally produced food into packaging materials to seal the same. In kimchi as an example, a process has to be performed in which kimchi mixed with spices, which is a solid material, and kimchi fluid, which is a liquid material, are inserted together into a packaging material prepared in advance.

This inserting process may be performed in such a manner that a portion of the packaging material is opened and the food is allowed to fall into the opened portion. In order to input the food in the falling manner, a method of using a chute, through which the food is guided, and an O-ring which fixes the chute and is made of a rubber material, is mainly used. In this case, however, there is a problem that the liquid material leaks from a gap of the chute so that sealing of the packaging material is defective. There is also a big problem that as being continuously exposed to the liquid material, the O-ring may be corroded to be broken and thus, may be mixed into the product inside the packaging material.

In order to prevent this leakage of the liquid material, a method for covering the chute with a vinyl sheet to prevent the leakage may be used, but may cause another problem that the thin vinyl sheet is stretched or torn during repeated input processes and thus, like the O-ring, is mixed into the product. Accordingly, a safer food inputting apparatus and food inputting method are required.

DISCLOSURE OF THE INVENTION

Technical Problem

The present invention has been devised to solve the problems as above and an object of the present invention is to provide an apparatus and method for inputting food so as to input the food including a liquid material into a packaging material without leakage.

Technical Solution

A food inputting apparatus according to an embodiment of the present invention includes: a supply unit provided so as to discharge food downward; a chute unit including a chute body through which the food discharged from the supply unit passes while falling due to a self-weight; a shutter unit comprising a shutter body provided so as to be opened or closed in accordance with whether the food discharged from the chute unit is to be discharged into a packaging material, and, in a closed state, the shutter body is positioned between an upper side of an upwardly opened opening of the packaging material and a chute outlet provided at a lower end of the chute unit; and a suction unit provided to suction liquid collecting inside the shutter body in the closed state.

A food inputting method according to an embodiment of the present invention includes: preparing a packaging material having an upper end in which an opening is defined; opening a shutter body to be in contact with an inner side surface of the packaging material; inserting a chute body into the shutter body; inputting food into the chute body downward so that the food is input into the packaging material due to a self-weight; closing the shutter body; and suctioning and removing liquid, which collects inside the shutter body, by using a suction unit.

Advantageous Effects

Accordingly, the food including the liquid material may be input into the packaging material with the minimized leakage.

MODE FOR CARRYING OUT THE INVENTION

Figure 1:
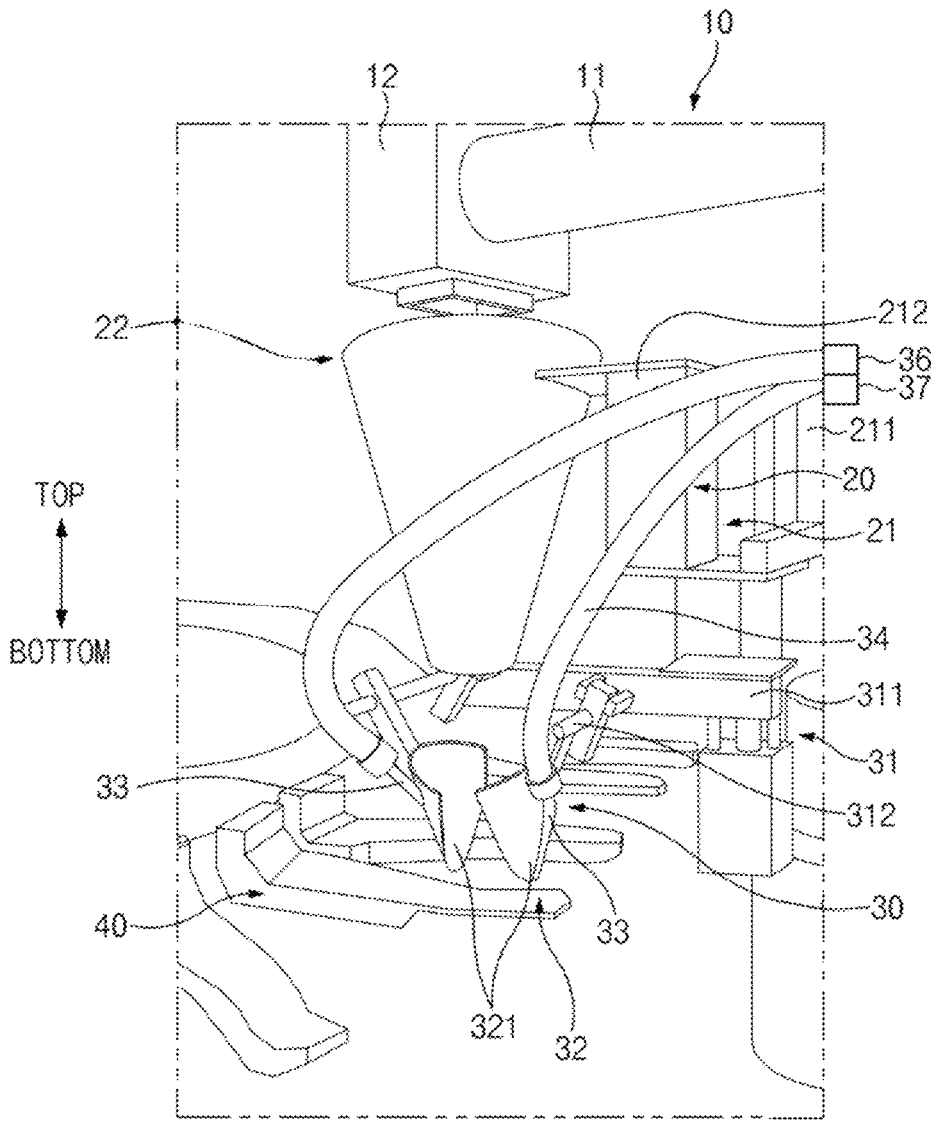
FIG. 1 is a perspective view of a state in which a discharging guide 13 is not shown in a food inputting apparatus according to an embodiment of the present invention.

Hereinafter, some embodiments of the present invention will be described in detail with reference to the accompanying drawings. Note that like components in the drawings are designated by like reference numerals as far as possible even if they are shown in different drawings. In the following description of the present invention, a detailed description of known functions and configurations incorporated herein will be omitted to avoid making the subject matter of the present invention unclear.

The terms such as "first", "second", "A", "B", "(a)", and "(b)", may be used to describe elements according to an embodiment of the present invention. However, since these terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

Figure 2:
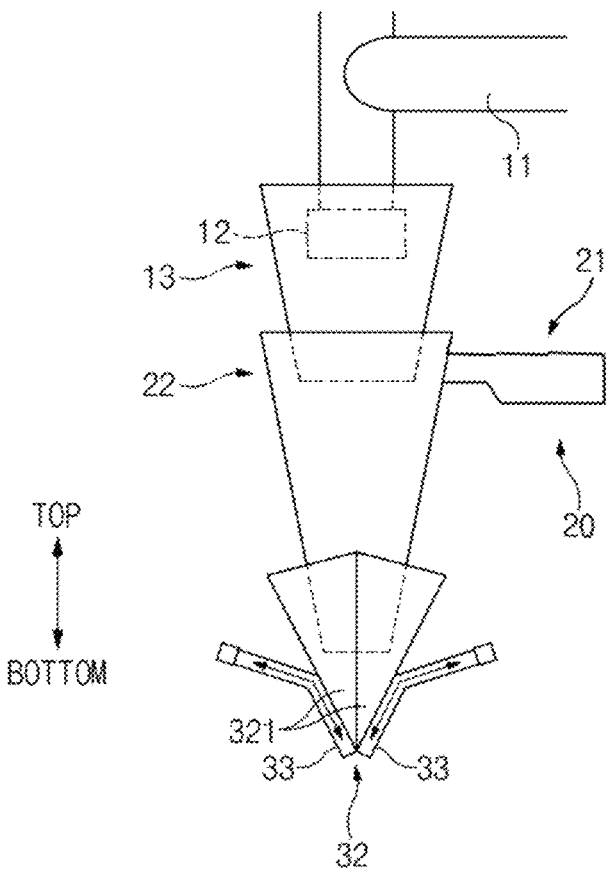
FIG. 2 is a conceptual view illustrating a state in which a shutter body of a food inputting apparatus is closed according to an embodiment of the present invention.
Figure 3:
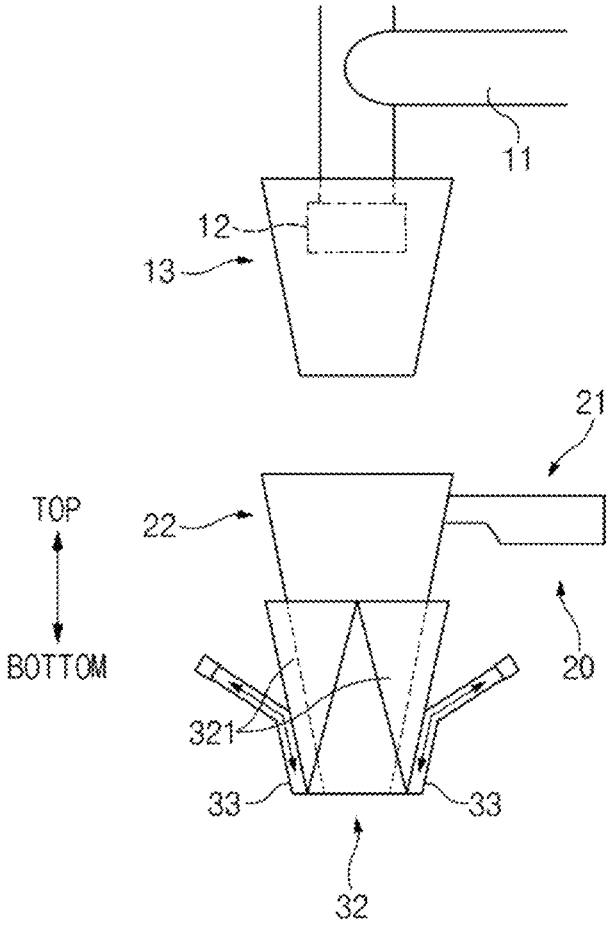
FIG. 3 is a conceptual view illustrating a state in which a shutter body of a food inputting apparatus is opened according to an embodiment of the present invention.
Figure 4:
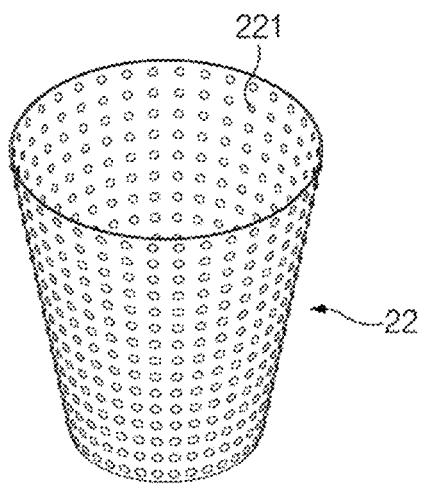
FIG. 4 is a conceptual view illustrating a chute body and an embossment disposed inside the chute body of a food inputting apparatus according to an embodiment of the present invention.

FIG. 1 is a perspective view of a state in which a discharging guide 13 is not shown in a food inputting apparatus according to an embodiment of the present invention. FIG. 2 is a conceptual view illustrating a state in which a shutter body 32 of a food inputting apparatus is closed according to an embodiment of the present invention. FIG. 3 is a conceptual view illustrating a state in which the shutter body 32 of the food inputting apparatus is opened according to an embodiment of the present invention. FIG. 4 is a conceptual view illustrating a chute body 22 and an embossment 221 disposed inside the chute body 22 of the food inputting apparatus according to an embodiment of the present invention.

Referring to the drawings, the food inputting apparatus according to an embodiment of the present invention includes a supply unit 10, a chute unit 20, and a shutter unit 30. The food inputting apparatus according to an embodiment of the present invention may include a suction unit. The food treated in the food inputting apparatus according to an embodiment of the present invention may be kimchi, but the type of the food is not limited thereto. In this specification, an upward and downward direction, a front and rear direction, and a left and right direction are expressions used for convenience of explanation, and may be directions perpendicularly crossing each other.

Supply Unit 10

The supply unit 10 is a part provided to discharge food downward. The supply unit 10 may be connected to a device, which processes the food, to receive and discharge the food. The supply unit 10 may include a transfer member 11 connected to the device that processes the food, and a discharging member 12 that discharges the food, which is transferred through the transfer member 11, downward.

The food may be transferred to the discharging member 12 through the transfer member 11 in a direction other than the upward and downward direction. The food that arrives at the discharging member 12 may be selectively discharged downward as the discharging member 12 is controlled. In order to enable this selective discharge, in the discharging member 12, a hole that is opened in the upward and downward directions may be defined, and a switching member (not shown) capable of selectively opening and closing this hole may be disposed.

The supply unit 10 may further include the discharging guide 13. The discharging guide 13 may have a shape extending vertically, and may be provided to have a shape penetrated vertically so that the food passes through the discharging guide 13 vertically. The discharging guide 13 may be coupled to the discharging member 12. Thus, the food discharged downward from the discharging member 12 may be guided to a predetermined position through the discharging guide 13 while falling. The discharging guide 13 may have a lower portion having a shape in which a cross-sectional area taken along a plane perpendicularly crossing the upward and downward direction gradually decreases downward. Thus, the discharging guide 13 may prevent scattering of the food discharged by the discharging member 12. An outlet disposed at a lower end of the discharging guide 13 may communicate with the chute body 22 of the chute unit 20.

Chute Unit 20

The chute unit 20 may include the chute body 22, through which the food discharged from the supply unit 22 passes while falling due to a self-weight, and may include a chute frame 21 that is coupled to this chute body 22 to fix or move the chute body 22.

The chute body 22 may have a shape in which a cross-sectional area taken along a plane perpendicularly crossing the upward and downward direction gradually decreases downward. The food discharged from the supply unit 10 may be introduced downward into an inlet disposed at an upper end of the chute body 22, and may fall to pass through a chute outlet disposed at a lower end of the chute body 22.

A plurality of embossments 221 may be provided to be uneven inside the chute body 22 so that the food input into the chute body 22 is not adsorbed to an inner side surface of the chute body 22 and is easily guided downward. The shape and size of the embossment 221 may be variously applied, and may be changed according to the size of food to be input and to whether food to be input is a liquid phase or a mixed phase.

As the chute body 22 is provided to have the shape described above, a lower portion of the discharging guide 13 may be smoothly inserted into the chute body 22. In addition, the food may be guided to the shutter body 32 through the chute body 22.

When the chute body 22 descends in a state in which the shutter body 32 is opened, a lower portion of the chute body 22 may be surrounded by the shutter body 32. The chute body 22 may be disposed above the shutter body 32, and be inserted into a center of the shutter body 32 to be surrounded when descending. As the lower portion of the chute body 22 is surrounded by the shutter body 32, the shutter body 32 may be inserted into an opening of a packaging material P (see FIG. 5), which is opened. Accordingly, the food discharged from the supply unit 10 may be guided to the opening of the packaging material P through the chute body 22. On the other hand, when the chute body 22 ascends, the lower portion of the discharging guide 13 may be inserted into an upper portion of the chute body 22.

The chute body 22 may be elevatable. The chute body 22 may be coupled to the chute frame 21. The chute frame 21 may include a chute fixing part 211 and a chute moving part 212. The chute fixing part 211 may serve as a framework fixed to the ground or the like. The chute moving part 212 may extend from the chute fixing part 211 in a direction crossing the upward-downward direction, and may be elevatably coupled to the chute fixing part 211 and have one end coupled to the chute body 22 so that when the chute moving part 212 has relative movement with respect to the chute fixing part 211, the chute body 22 is interlocked to be elevatable together. The chute moving part 212 and the chute fixing part 211 may be configured so that the chute moving part 212 and the chute fixing part 211 are coupled to each other through a method using a linear motion (LM) guide, a lead screw, or the like, to enable a linear motion of the chute moving part 212. However, the chute moving part 212 and the chute fixing part 211 may be also configured so that the elevating is performed together with rotation by using a swing arm structure or the like, and the coupling manner is not limited thereto.

The chute body may be provided in plurality. The plurality of chute bodies may constitute a multi-layered structure. The multi-layered structure may mean that the plurality of chute bodies are arranged vertically so that the food passes through each of the chute bodies when falling. The plurality of chute bodies may have lower ends, respectively, which are arranged to be spaced apart from each other vertically.

The respective chute bodies may be arranged to be spaced apart from each other vertically. Here, the chute bodies adjacent to each other vertically may have portions, respectively, which overlap each other when viewed horizontally. Accordingly, the food may stably fall through the multi-layered chute body structure without leaking or spattering of fluids.

Shutter Unit 30

The shutter unit 30 may include the shutter body 32, and include a shutter frame 31 for controlling a position and a posture of this shutter body 32. The shutter body 32 is provided to be opened and closed in accordance with whether the food discharged from the chute unit 20 is to be discharged into the packaging material P. The shutter body 32 may have a closed state and an opened state. In the closed state, the shutter body 32 may block at least a portion of the chute outlet of the chute body 22, and, in the opened state, the shutter body 32 may open the chute outlet of the chute body 22. In the closed state, the shutter body 32 may be disposed between an upper side of an opening of the packaging material P in a state of being opened upward by a gripping unit 40 and the chute outlet provided at a lower end of the chute unit 20. In the opened state, the chute body 22 may be inserted into the shutter body 32. When the chute body 22 is inserted into the shutter body 32 in the opened state, the lower end of the chute body 22 may be disposed below a lower end of the shutter body 32. The chute body 22 may be deeply inserted into the opening of the packaging material P so that the food input into the packaging material P through the chute body 22 does not contaminate a sealing portion formed around the opening of the packaging material P.

In the closed state, the shutter body 32 may completely block the chute outlet, but may not completely block the chute outlet. Thus, a micro-opening that is a small hole may remain at a center of the shutter body 32 in the closed state. A lower end of a shutter pipe 33 to be described later may be disposed to be adjacent to the micro-opening. Thus, residues and liquid of the food, which is discharged downward from the inside of the shutter body 32 through the micro-opening in the closed state, may be suctioned through the lower end of the shutter pipe 33 by an operation of the suction unit.

The shutter body 32 may have a plurality of shutter pieces 321. The shutter pieces 321 are described as being provided in two in an embodiment of the present invention, but the number thereof is not limited thereto. The shutter pieces 321 may individually move to render the closed state or to render the opened state. When being gathered together, the plurality of shutter pieces 321 block the chute outlet so that the closed state is rendered, and when being away from each other, the plurality of shutter pieces 321 open the chute outlet so that the opened state is rendered. As the chute outlet is opened in the opened state, the food falling through the chute body 22 may be input into the opening of the packaging material P due to the self-weight.

The shutter body 32 may have at least a partial shape of a side surface of a solid figure of which a cross-sectional area taken along a plane perpendicularly crossing the upward and downward direction gradually decreases downward in the closed state. The shutter body 32 may have at least a partial shape of a side surface of a cone protruding downward in the closed state. In an embodiment of the present invention, the shutter body 32 and the shutter pieces 321 are described as the shutter pieces 321 are provided at a left side and a right side, respectively, by taking the side surface of the cone along a plane perpendicularly crossing the left and right direction. However, the shape is not limited thereto, and other shapes may be also available as long as being easily inserted into the opening in the closed state, in which the shutter pieces 321 are gathered together, and being capable of securing the opening by change from the closed state to the opened state in which the shutter pieces 321 are away from each other. In addition, the direction of the plane along which the shutter body 32 is taken may be also changeable as appropriate.

In order to secure the opening of the packaging material P in the opened state, the shutter body 32 may be provided so that the shutter body 32 is inserted into the opening of the packaging material P to be in contact with the inner side surface of the packaging material P. On the other hand, in the closed state, the shutter body 32 may be disposed at a position separated from the opening of the packaging material P. Thus, in the closed state, the shutter body 32 may selectively have a state, in which the shutter body 32 ascends to be separated upward from the opening, and a state in which the shutter body 32 descends to be inserted into the opening. As the shutter pieces 321 are away from each other in the state in which the shutter body 32 descends to be inserted into the opening, the shutter pieces 321 may be in contact with the inner side surface of the packaging material P to secure the opening. Alternatively, however, the shutter body 32 may be disposed above the opening in the closed state, and operate in such a manner that while the shutter body 32 is shifted to be in the opened state, each of the shutter pieces 321 rotates to be inserted into the opening and is in contact with the inner side surface of the packaging material P to secure the opening.

In order to be disposed at the position as described above in each of the closed state and the opened state, the shutter body 32 may rotate around an axis passing at a portion of an upper portion in the front and rear direction, so that lower ends thereof are away from each other when the shutter body 32 is shifted from the closed state to the opened state.

As the shutter body 32 has the closed state and the opened state described above, and has to be shifted from one state to the other state, the shutter frame 31 may move each of the shutter pieces 321. The shutter body 32 may be coupled to the shutter frame 31. The shutter frame 31 may include a shutter fixing part 311 and a shutter moving part 312. The shutter fixing part 311 may serve as a framework fixed to the ground or the like. The shutter moving part 312 may be provided in plurality, and may have one end, which is coupled to the shutter fixing part 311, and the other end which is coupled to each of the shutter pieces 321. As illustrated, the shutter moving part 312 may be coupled to be rotatable with respect to the shutter fixing part 311 in a state of being coupled to the shutter piece 321, so that the shutter moving part 312 rotates the shutter piece 321 by rotating with respect to the shutter fixing part 311. However, the shutter moving part 312 may be configured as a hydraulic cylinder that, in a state in which another link rotatably fixes a portion of the shutter piece 321, applies only linear external force to other position of the shutter piece 321 so that the shutter piece 321 rotates. In addition, the shutter moving part 312 may be configured to be not only elevatable but also rotatable relatively with respect to the shutter fixing part 311.

When the shutter moving part 312 has the relative movement with respect to the shutter fixing part 311, the shutter piece 321 may operate therewith so as to have the movement together. The shutter moving part 312 and the shutter fixing part 311 may be configured so that the shutter moving part 312 and the shutter fixing part 311 are coupled to each other through a method using a linear motion (LM) guide, a lead screw, or the like, to enable a linear motion of the shutter moving part 312. However, the shutter moving part 312 and the shutter fixing part 311 may be also configured so that elevating is performed together with rotation by using a swing arm structure or the like, and the coupling manner is not limited thereto.

The shutter unit 30 may include the shutter pipe 33. The shutter pipe 33 is a pipe type component that is disposed outside the shutter body 32 and has one end, which is disposed to be adjacent to the lower end of the shutter body 32 and communicates with the inside of the shutter body 32, and the other end which communicates with a suction unit 34 to be described later. The shutter pipe 33 may be disposed to be in close contact with an outer side surface of the shutter body 32. The shutter pipe 33 may be provided in the number corresponding to the number of the shutter pieces 321 to be disposed on each of the shutter pieces 321.

Suction Unit

The suction unit is a component that is provided to suction liquid collecting inside the shutter body 32 in the closed state. When the shutter body 32 is provided to have a conical shape protruding downward in the closed state as in an embodiment of the present invention, the liquid may naturally collect in the inside of the shutter body 32 adjacent to an apex of the shutter body 32. When this liquid is not removed during the inputting of the food, the sealing of the packaging material P may be defective. In an embodiment of the present invention, the suction unit may remove this liquid to prevent the sealing of the packaging material P from being defective. In addition, cleanliness of the food inputting apparatus may be improved. Here, the inside of the shutter body 32 means a portion that is surrounded by the shutter body 32 at an upper side of the shutter body 32.

The suction unit may include a suction pipe 34 and a negative pressure supply module 36. The suction pipe 34 may communicate with the other end of the shutter pipe 33. The suction pipe 34 may have one end that communicates with the inside of the shutter body 32 through the shutter pipe 33 in the closed state. Thus, the one end of the suction pipe 34 may communicate with the inside of the shutter body 32 through the lower end of the shutter body 32.

The suction pipe 34 may have the other end that is connected to the negative pressure supply module 36 and receives a negative pressure from the negative pressure supply 36 module so that the one end of the suction pipe 34 suctions the liquid. The negative pressure supply module 36 may include a device, such as a pump, for generating a negative pressure, but the device capable of generating negative pressure is not limited thereto.

The suction unit may further include a blower module 37. The blower module 37 is provided to forcibly supply air to the other end of the suction pipe 34 so as to push matter blocking the suction pipe 34 to the outside through the one end of the suction pipe 34. As the blower module 37 forcibly supplies the air to the suction pipe 34, foreign matter that is present inside the suction pipe 34 or the shutter pipe 33 or blocks an inlet of the shutter pipe 33 may be pushed to the inside of the shutter piece 321 by the air. This foreign matter may remain in the suction pipe 34 or the shutter pipe 33 as the suction is not properly performed during the suctioning process. Here, the blower module 37 may blow and remove the foreign matter by using compressed air in a direction opposite to a direction in which the suction is performed. Accordingly, the suctioning operation is smoothly performed.

The blower module 37 may include the device such as a pump, to forcibly supply the air to the suction pipe 34, but the device for forcibly supplying the air is not limited thereto.

Gripping Unit 40

The food inputting apparatus according to an embodiment of the present invention may include a gripping unit 40. The gripping unit 40 may grip the packaging material P. The packaging material P may be gripped by the gripping unit 40 in a state in which an opening at an upper side thereof is opened to face upward. When filling of the packaging material P is completed, the gripping unit 40 may move the filled packaging material P, and may dispose the empty packaging material P at a position for packaging. The gripping unit 40 may be disposed below the shutter body 32 in the closed state.

Figure 5:
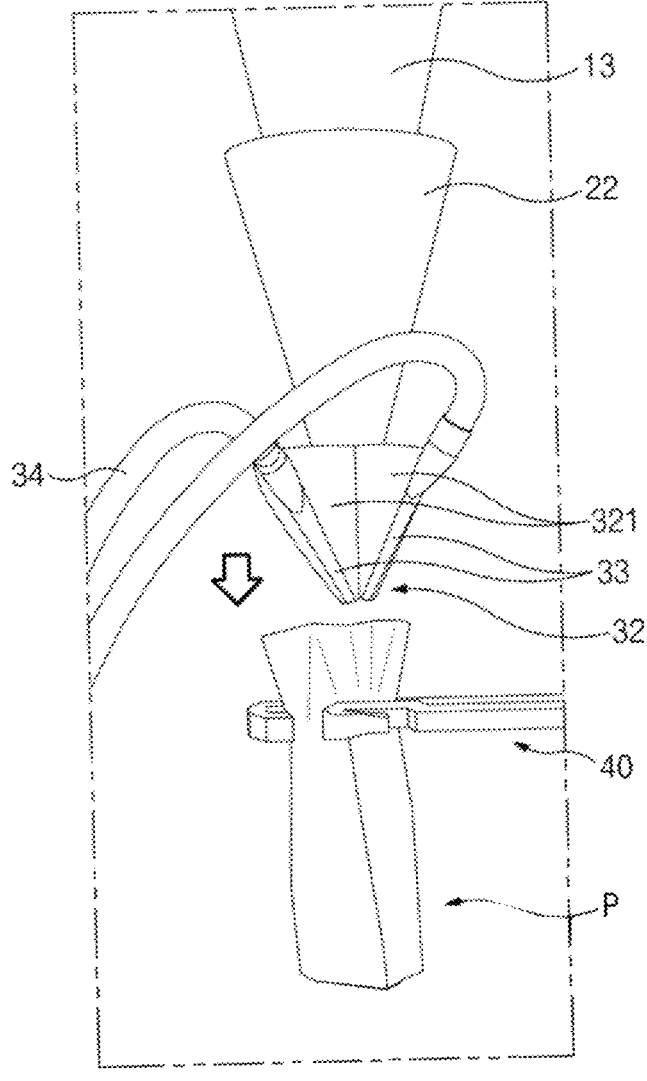
FIG. 5 is a conceptual view illustrating a state in which a shutter body of a food inputting apparatus descends in a closed state according to an embodiment of the present invention.
Figure 6:
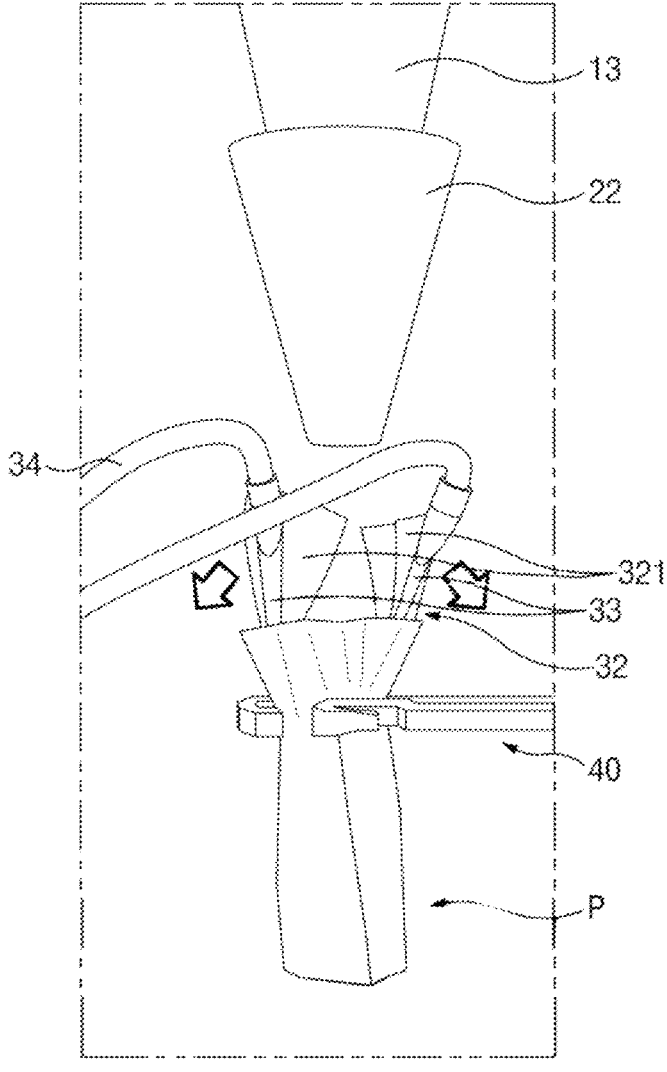
FIG. 6 is a conceptual view illustrating a state in which a packaging material is opened while a shutter body of a food inputting apparatus is shifted to be in an opened state according to an embodiment of the present invention.
Figure 7:
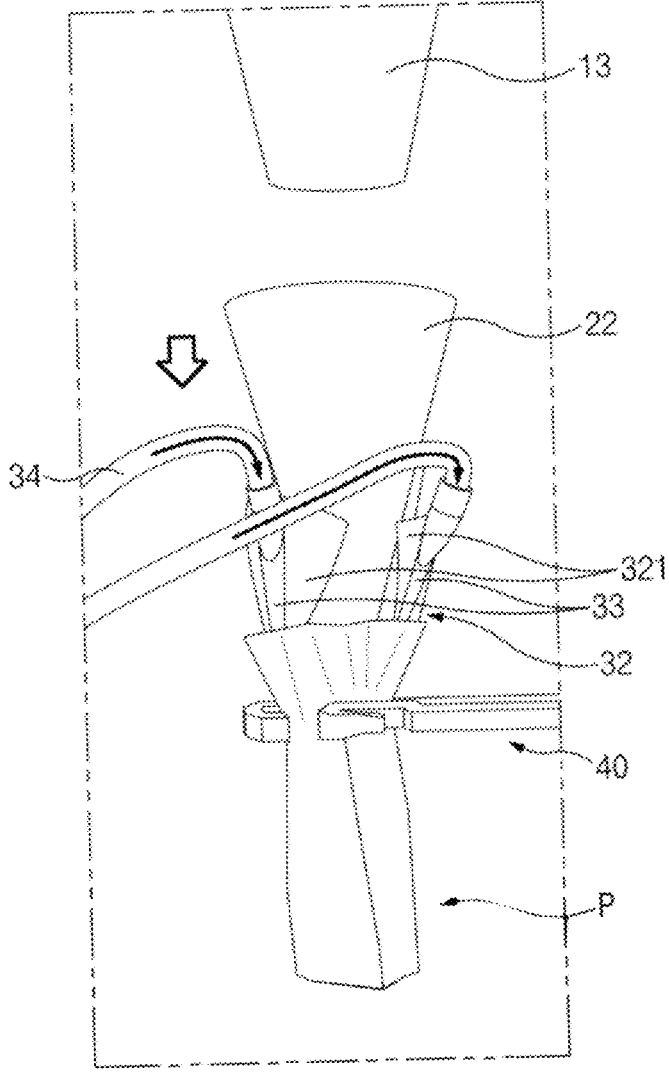
FIG. 7 is a conceptual view illustrating a state in which a chute body of a food inputting apparatus descends to be inserted into an opening of a packaging material according to an embodiment of the present invention.
Figure 8:
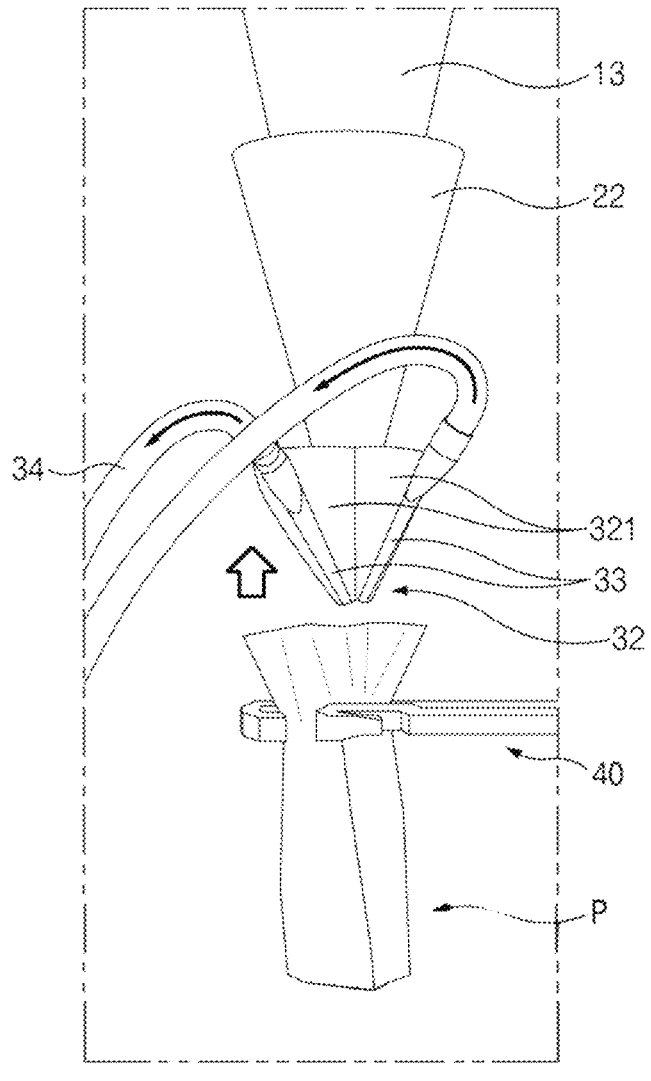
FIG. 8 is a conceptual view illustrating a state in which a shutter body and a chute body of a food inputting apparatus ascend and suction is performed according to an embodiment of the present invention.
Figure 9:
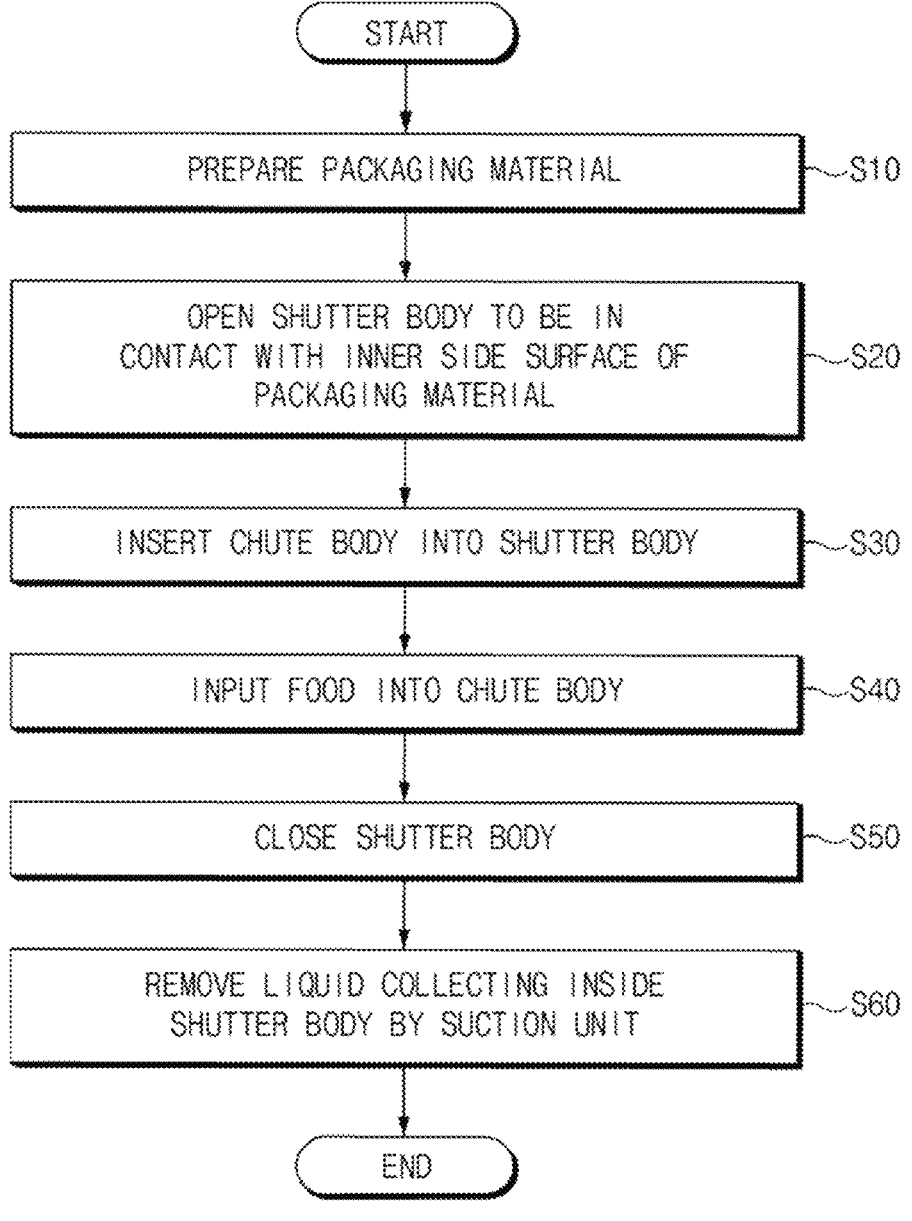
FIG. 9 is a flowchart illustrating a food inputting method using a food inputting apparatus according to an embodiment of the present invention.

FIG. 5 is a conceptual view illustrating a state in which a shutter body 32 of a food inputting apparatus descends in a closed state according to an embodiment of the present invention. FIG. 6 is a conceptual view illustrating a state in which a packaging material P is opened while the shutter body 32 of the food inputting apparatus is shifted to be in an opened state according to an embodiment of the present invention. FIG. 7 is a conceptual view illustrating a state in which a chute body 22 of the food inputting apparatus descends to be inserted into an opening of the packaging material P according to an embodiment of the present invention. FIG. 8 is a conceptual view illustrating a state in which the shutter body 32 and the chute body 32 of the food inputting apparatus ascend and suction is performed according to an embodiment of the present invention. FIG. 9 is a flowchart illustrating a food inputting method using the food inputting apparatus according to an embodiment of the present invention.

The food inputting method using the food inputting apparatus according to an embodiment of the present invention will be described with reference to FIGS. 5 to 9. Preparing the packaging material P having an upper end in which an opening is defined (S10) may be performed. A gripping unit 40 may grip the packaging material P, and the opening may be secured to have a predetermined area. Here, the predetermined area may be an area into which a portion of the shutter body 32 in the closed state is insertable but the shutter body 32 is not insertable.

As in FIG. 5, inserting the shutter body 32 in the closed state into the opening of the packaging material P (S20) may be performed. Thereafter, as in FIG. 6, the shutter body 32 is opened to allow shutter pieces 321 to be away from each other so that the shutter body 32 is in contact with an inner side surface of the packaging material P. Accordingly, the opening of the packaging material P may be secured to have another predetermined area.

As in FIG. 7, forcibly supplying air to a suction pipe 34 may be performed to push matter blocking the suction pipe 34 to the outside. The forcibly supplying of the air may be performed together with the inserting of the shutter body 32 into the opening of the packaging material P (S20), or may be also performed after the shutter body 32 is opened. The matter blocking the suction pipe 34 may be pushed by the forcibly supplied air and fall into the packaging material P.

As in FIG. 7, allowing the chute body 22 to descend to be inserted into the shutter body 32 (S30) may be performed. The opening may be inserted into a lower portion of the chute body 22. Thereafter, a supply unit 10 may be controlled to input the food into the chute body 22 downward so that the food is input into the packaging material P due to a self-weight (S40). The food input into the chute body 22 may be guided to the opening of the packaging material P by the chute body 22 so that the food falls to be accommodated in the packaging material P.

The chute body 22 may be allowed to ascend as in FIG. 8 after the inputting of the food is completed. Then, the shutter body 32 may be closed (S50). The shutter body 32 may ascend after the chute body 22 ascends. Liquid collecting inside the shutter body 32 may be suctioned and removed by using a suction unit (S60). Thus, a situation may be prevented in which the liquid or a small piece of the food falls. The removing of the liquid using the suction unit may be performed when the shutter body 32 ascends, or may be also performed when the shutter body 32 is closed. The closing of the shutter body 32 (S50) may be performed together when the shutter body 32 ascends, may be performed before the shutter body 32 ascends, or may be performed after the shutter body 32 ascends. Thereafter, the gripping unit 40 may transfer the filled packaging material P to a subsequent sealing process, and dispose the empty packaging material P below the chute body 22 again. Then, the food inputting method may be repeated from the first process as described.

Although all of the components constituting the embodiments of the present invention are described to be combined as one unit or to operate as a combination thereof, the present invention is not necessarily limited to these embodiments. That is, within the scope of the present invention, all of the components may be selectively combined to one or more thereof to operate as a combination. The term such as "comprising," "configure", or "having", specifies the presence of components, unless there is a clearly different meaning in the present disclosure, but do not preclude the presence thereof and should be construed to further include other components. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The description of the present invention is intended to be illustrative, and various changes and modifications can be made by those of ordinary skill in the art to which the present invention pertains, without departing from the spirit and scope of the present invention as defined by the appended claims. Therefore, the embodiments set forth herein are to describe the technical spirit of the present invention and not to limit. The scope of the technical spirit of the present invention is not limited by the embodiments. Moreover, the protective scope of the present invention should be determined by reasonable interpretation of the appended claims and all technical concepts coming within the equivalency range of the present application should be interpreted to be in the scope of the right of the present application.

The invention claimed is:

1. A food inputting apparatus comprising:

a supply unit configured to discharge food downward;

a chute unit comprising a chute body through which the food discharged from the supply unit passes while falling due to a self-weight;

a shutter unit comprising a shutter body provided so as to be opened or closed in accordance with whether the food discharged from the chute unit is to be discharged into a packaging material, and, in a closed state, the shutter body is positioned between an upper side of an upwardly opened opening of the packaging material and a chute outlet provided at a lower end of the chute unit; and a suction unit configured to suction liquid collecting inside the shutter body in the closed state, wherein the suction unit comprises:

a suction pipe having one end that is communicated with the inside of the shutter body in the closed state;

a negative pressure supply module configured to supply a negative pressure to another end of the suction pipe so that the liquid is suctioned through the one end of the suction pipe, and a blower module configured to forcibly supply air to the other end of the suction pipe so as to push matter blocking the suction pipe to the outside through the one end of the suction pipe.

2. The food inputting apparatus of claim 1, wherein the shutter assembly unit further comprises a shutter pipe disposed on an outer side surface of the shutter body and having one end that communicates with the inside of the shutter body at a lower end of the shutter body, wherein the one end of the suction pipe communicates with another end of the shutter pipe.

3. The food inputting apparatus of claim 1, wherein the shutter body has a plurality of shutter pieces, wherein, in the closed state, the plurality of shutter pieces are gathered together to block the chute outlet, and in the opened state, the plurality of shutter pieces are away from each other to open the chute outlet so that the food is input into the opening due to a self-weight.

4. The food inputting apparatus of claim 3, wherein the shutter body has at least a partial shape of a side surface of a solid figure of which a cross-sectional area taken along a plane perpendicularly crossing an upward and downward direction gradually decreases downward in the closed state.

5. The food inputting apparatus of claim 4, wherein the shutter body has at least a partial shape of a side surface of a cone protruding downward in the closed state.

6. The food inputting apparatus of claim 1, wherein the shutter body is provided so that the shutter body is inserted into the opening of the packaging material to be in contact with an inner side surface of the packaging material, so as to secure the opening of the packaging material in the opened state.

7. The food inputting apparatus of claim 1, wherein an embossment is provided in an inner side surface of the chute body to guide the input food downward.

8. The food inputting apparatus of claim 1, wherein the chute body has a shape in which a cross-sectional area taken along a plane perpendicularly crossing an upward and downward direction gradually decreases downward.

9. The food inputting apparatus of claim 1, wherein the chute body is disposed to be surrounded by the shutter body when the shutter body descends in the opened state.

10. The food inputting apparatus of claim 1, wherein the chute body is provided in plurality, Wherein the plurality of chute bodies have lower ends, respectively, that are arranged to be spaced apart from each other in an upward and downward direction.

11. A food inputting method comprising:

preparing a packaging material having an upper end in which an opening is defined;

opening a shutter body to be in contact with an inner side surface of the packaging material;

insert a chute body into the shutter body;

inputting food into the chute body downward so that the food is input into the packaging material due to a self-weight;

closing the shutter body; and suctioning and removing liquid, which collects inside the shutter body, by using a suction unit.

12. The food inputting method of claim 11, further comprising forcibly supplying air to a suction pipe so as to push, to the outside, matter that is present inside the suction pipe comprised in the suction unit.

13. The food inputting method of claim 11, further comprising allowing the chute body to ascend before the closing of the shutter body.

14. The food inputting method of claim 11, further comprising inserting the shutter body in a closed state into the opening before the opening of the shutter body.

* * * * *